May 17, 1932. T. NAGAMINE 1,858,965
COVERING FOR MOTORCAR TIRES
Filed Jan. 7, 1930
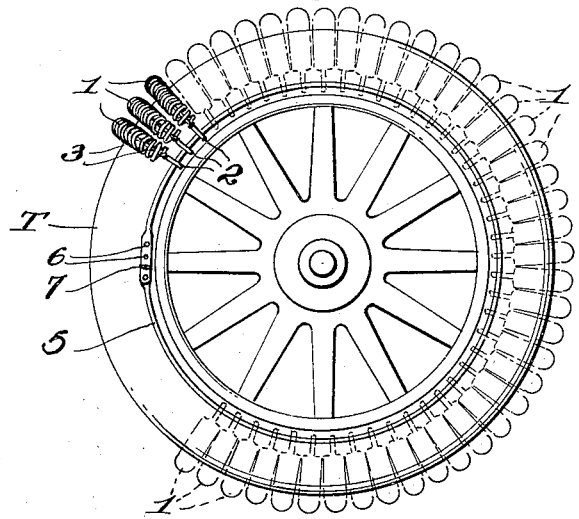
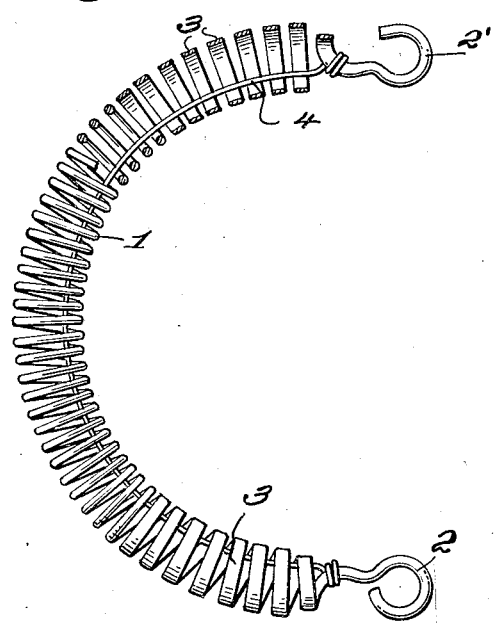
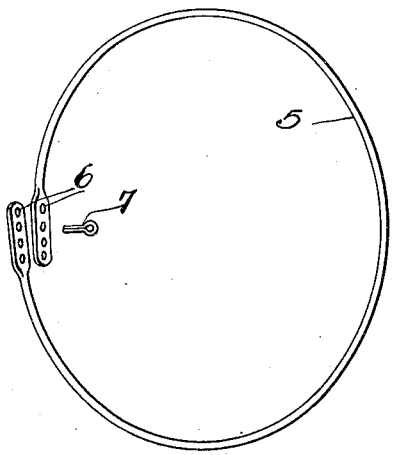
Inventor
Tokijiro Nagamine
By B. Linger
Attorney Patented May 17, 1932

1,858,965

UNITED STATES PATENT OFFICE

TOKIJIRO NAGAMINE, OF TOKIIRIMACHI, UYEDA, JAPAN

COVERING FOR MOTORCAR TIRES

Application filed January 7, 1930, Serial No. 419,168, and in Japan May 29, 1929.

This invention relates to coverings for tires, and more particularly metallic coverings for pneumatic tires for motor cars.

It has been already proposed to protect the motor car tires by using coverings formed by interlacing wire springs. However, all known protectors of this type is used only for the purpose of protecting the tire against wear and of preventing skidding action, but none of them possesses non-splash and non-dust-raising functions.

One of the objects of my invention is to provide a tire covering of a simple and strong construction, and having not only a protecting and non-skidding effect, but also non-splash and non-dust-raising effects.

The invention possesses other advantageous features, some of which with the foregoing, will be set forth at length in the following description, where I shall outline in full that form of the invention which I have selected for illustration in the drawings accompanying and forming part of the present specification. In said drawings I have shown one form of construction according to the invention, but it is to be understood that I do not limit myself to such form, since the invention, as set forth in the claim, may be embodied in a plurality of forms.

Referring to said drawings:

Figure 1 is an elevation of a motor car tire fitted with the device according to my invention, a part of the covering being removed.

Figure 2 is an enlarged detail view showing partly in section of one of the spring elements constituting the covering.

Figure 3 is a perspective detail view of one of the retaining rings.

Referring to the drawings, the tire covering according to my invention consists of a plurality of spiral spring elements 1, one of which is shown in Figure 2 in an enlarged scale, and partly in section. This spiral spring is made of steel wire of, for instance, 6 or 7 B. w. g., and the diameter of the spiral is made comparatively large for the purpose hereinafter described. The spring is bent into a semi-circular form or into a shape of a horseshoe to conform to the contour of the tire.

Each end of said spiral spring terminates into an eye 2, but for certain numbers of springs which are to be mounted to the tire during the latter part of the operation for mounting same, the end of the spring 1 is formed into a mere hook 2' as shown at the opposite end in Figure 2.

Near both ends of the spiral part, that is, at the parts which do not constitute the tread part, the wire forming the spiral is flattened to increase its width for a certain extent as shown at 3, whereby to reduce the length of the wire required. It is obvious that the flattened surface of said parts 3 lies parallel to the center line of the spiral spring. The distance between the coils may be varied according to the size of the tire for which the covering is used. While the distance between the coils is shown equal throughout the whole length of the spiral, it is to be understood that at the middle part which is to form the tread part such distance may be made larger than that shown, whilst at the flattened wire parts the distance may be made smaller than that shown.

A restraining wire 4 is connected near one end of the spiral spring 1, which wire 4 being passed through the spiral, and at the other end it is connected to other end of the spring as shown in Figure 2. The said restraining wire 4 serves to prevent the spiral spring from being excessively tensioned. In case the spiral spring is broken, said wire 4 also serves to prevent the broken ends of the spiral spring from springing out.

Now, before the tire is inflated, a plurality of the spiral springs 1 before mentioned are mounted along the whole circumference of the tire using two retaining rings 5, each of which is adjustably united together by means of a plurality of holes 6 formed therein near the flattened ends of the wire and a pin or pins 7 inserted therein. By such means the diameter of the retaining ring 5 may be adjusted at will for a certain extent. Before uniting together with joint of the ring 5, the eyes 2 at the ends of the spiral springs 1 are successively passed onto the ring 5 on both sides of the wheel. During the last part of the operation of mounting the spiral spring, the spiral springs 1 having the hooked ends 2' are employed instead of those having the eyes 2. To mount such spiral spring between two retaining rings 5 and over the tire, the rings 5 are pulled radially outwardly and the hooked ends 2' of the spring are pulled inwardly by means of suitable implements. After the completion of the mounting of the springs along whole circumference of the tire T to form an endless covering around the tire, the latter is then inflated at more or less higher pressure than usual. Detachment of the covering may be also simply effected by a reversed operation.

According to my invention, it will be seen that not only the tire T is protected against wear, but also various unexpected results as follows may be obtained by its peculiar construction.

Firstly, the motor car wheel fitted with the covering according to my invention will never produce splash or at least such splash may be greatly reduced. It has been found by experience that the back splash may be greatly reduced of its energy, and that the side splash may be almost completely eliminated by the employment of my device. This is greatly advantageous especially in rainy countries.

Secondly, when run on dry road, the wheel fitted with my device will not raise so large an amount of dust as in the case of the ordinary tire. Thus, the tire fitted with my device will act as a non-dust-raising tire.

The above-mentioned two functions are due to the facts that according to my invention the tire is covered all around its contour by a cage-like metallic covering composed of the spiral springs having a comparatively large diameter, and that there is an ample space of annular shape between the tire surface and the outer surface of the covering.

Thirdly, the tire fitted with the covering according to my invention acts as a non-side-skidding tire on any road. Each spiral spring 1 is independently mounted and is of comparatively large diameter, so that the spring itself adds to the flexibility of the tire, and thereby greatly increases the cushion of the tire.

As the tire fitted with the covering according to my invention acts as a non-splash, non-dust-raising and non-skidding tire and may be used for any weather, it will not be necessary to detach the covering frequently. But, when necessary, the operation of detaching and mounting of the covering can be effected in a simple manner. It is also to be understood that in case of wear or breakage a single spiral spring 1 may be interchanged independently of others.

What I claim is:—

An armor for pneumatic tires, comprising a plurality of coiled springs arranged radially of the tire and side by side and covering the circumference of the tire, said springs being independent of one another and each being provided with a restraining wire extending therethrough from end to end, and provided with attaching devices at its ends and retaining rings on opposite sides of the tire and to which the said springs are connected by said attaching devices, the wire of the convolutions of the central portion of each spring, which bear on the tread portion of the tire being cross sectionally cylindrical and the wire of the end convolutions of each said spring which recede from said central convolutions being rectangular in cross section and presenting flat, relatively broad outer and inner surfaces to bear respectively on the road and against the tire.

In testimony whereof I affix my signature.

TOKIJIRO NAGAMINE.